3,004,824
COPPER PHOSPHATE SALTS
John Beukenkamp, Morgan, N.J., assignor to Colgate Palmolive Company, New York, N.Y., a corporation of Delaware
No Drawing. Filed Mar. 18, 1957, Ser. No. 646,525
3 Claims. (Cl. 23—105)

The present invention relates to the preparation of a copper phosphate salt, as hereinafter described and claimed.

It has now been discovered that a copper phosphate may be prepared in high purity from copper cation and phosphate anion by treating an ion exchange resin containing one of said ions with an aqueous solution containing the other of said ions to form a solution containing copper and phosphate ions, and separating the solution from the ion exchange resin. A preferred embodiment of the present invention comprises a process for the preparation of copper polyphosphate by reaction of an alkali metal polyphosphate solution with a cation-exchange resin containing copper ions to form an effluent containing said copper polyphosphate.

In general, the reaction of the copper-containing cation exchange resin is with an aqueous solution of a water-soluble monovalent phosphate salt which is derived from orthophosphoric acid (e.g. trisodium phosphate) or preferably from a polyphosphoric acid, including mixtures thereof. The water-soluble polyphosphate salt may be considered as formed from orthophosphoric acid or the like by the removal of water though it may be formed by any suitable means of manufacture. Examples of such molecularly-dehydrated or condensed polyphosphate salts are the alkali metal, ammonium, alkylamine and alkylolamine salts of tripolyphosphate, tetraphosphoric, pyrophosphoric acids, and the like. For convenience, the term "alkali metal" will refer to the soluble alkali metal, ammonium and substituted ammonium phosphate salts reactable with the copper ion of the cation-exchange resin. More particularly, it is preferred to use the soluble tripolyphosphate salts such as sodium, potassium and ethanolamine tripolyphosphate. Other soluble polyphosphate salts are tetrasodium, tetrapotassium, and ammonium pyrophosphate.

The cation-exchange resins which are treated to contain the copper ions are known water-insoluble materials and can absorb metallic cations in exchange for hydrogen ions or other replaceable ions. It is preferred to use a strongly acidic or salt-splitting cation-exchange resin containing sulfonic acid groups as the functional group. These sulfonated resins have usually a cross-linked polystyrene copolymer nucleus or phenol-formaldehyde base. For example, a material known as Dowex 50 is particularly suitable, such resin being the product of the nuclear sulfonation of a cross-linked copolymer of styrene and divinylbenzene. It is employed in any convenient particle size, e.g., 50–400 dry mesh, and any desired amount of divinylbenzene, e.g., 1–16%. Other known cation-exchange resins may be employed also, such as the weakly acidic or adsorbing resins containing a carboxylic acid group as the functional group, e.g., Amberlite IRC-50. The natural and synthetic zeolites, phosphonic acid resins and sulfonated coal are other examples of known cation-exchange materials.

Such cation-exchange resins are treated in any suitable manner in order that the resins contain said copper cation. For example, the cation resin particles, either by batch or column method, are washed with an aqueous cupric chloride or similar solution which results in the resin containing cupric ions. The resin particles should be further washed with water to remove any excess copper and chloride ions. Other aqueous solutions of cupric or cuprous salts may be used in similar manner, particularly soluble inorganic copper salts such as the soluble halides (e.g. chlorides, bromides), nitrates, perchlorates, sulfates, and the like.

As indicated, this ion exchange method of forming the copper phosphate is conducted by treating the resin particles containing the copper cation with an aqueous solution of the water-soluble alkali metal polyphosphate salt or the like. The solution may contain additional liquid solvent provided that it does not substantially adversely affect the reaction. Any suitable technique for contacting solutions with ion exchange resins may be employed, such as the batch or column method. It is preferred for optimum results and efficiency to use the column operation wherein the resin bed is fixed or moving and the feed solution flows past the resin in any desired direction. In practice, it is most convenient usually to use a fixed bed such as a vertical cylinder filled with ion exchange resin with down flow operation.

As the feed solution percolates or filters through the bed or column of resin particles, it has been found that the equilibrium is shifted in favor of the exchange of the copper ion of the resin for the alkali metal cation in the original phosphate solution so that the effluent contains the desired copper phosphate. For example, treatment of a cupric-containing cation exchanger with an aqueous solution of sodium tripolyphosphate results in virtually complete ion exchange so that the effluent contains cupric and tripolyphosphate ions and does not have any significant or analyzable alkali metal content. As a result of this reaction, the copper phosphate may be obtained in high purity, free of contamination, by-products or unreacted material.

The operating conditions for the ion exchange reaction are not critical. It may be conducted at room temperature or reasonably elevated temperatures if desired. The alkali metal polyphosphate may be in dilute or concentrated aqueous solution up to its solubility limit. The resin particles may be of any practical size such as from about 20–400 mesh, though it is preferred to use particles from about 100–200 mesh. After the resin has been exhausted or when desired, it can be regenerated readily by passage of additional copper salt solution through the cation-exchanger.

As indicated, the effluent contains the copper phosphate and is free from analyzable sodium ions or the like. This ion exchange process is considered unusual since it would be expected that copper tripolyphosphate and other insoluble copper phosphate salts would precipitate in the resin column but it has been discovered that such salts are concentrated in the effluent. As indicative of the specificity of action, it has been found that the same process is not successful using the same cation-exchanger containing aluminum ions (rather than copper) since the aluminum phosphate salt was precipitated in the resin and was not present or dissolved in the effluent.

The copper phosphate salt may be recovered from the effluent in its hydrated form, if desired, by any suitable manner which will separate the solvent such as by drying of the effluent and crystallization of the heavy metal salts. It has been found that the addition of a lower aliphatic alcohol such as ethyl alcohol results in precipitation of the salt also. This copper phosphate may be subjected to any conventional means of further purification, if desired, such as by washing, drying, solvent extraction or crystallization.

When the copper tripolyphosphate hydrate in the effluent is recovered from the solution, it is a blue crystalline solid which is insoluble in water. According to analysis, it has a formula corresponding to copper tripolyphosphate having about 10 to 12 moles of water and is believed to be a new chemical material.

The copper tripolyphosphate hydrate has characteristic properties resulting in usefulness in many fields. For example, this copper salt is an anti-bacterial and anti-fungus agent, viscosity modifier, insecticidal agent, etc., and may be employed in anti-bacterial, cosmetic, pharmaceutical, insecticidal and detergent compositions, in well-drilling fluids, and the like.

The instant process is particularly useful since there is formed directly an aqueous solution of the copper tripolyphosphate or the like in high purity whereas it has been found that the precipitated copper tripolyphosphate hydrate is essentially insoluble in water. This aqueous solution of the copper phosphate (effluent) may be employed directly for the indicated uses.

The process may be conducted also using an anion-exchange resin containing the phosphate anion with passage of a copper salt solution through the column in the same way as described above using the cation-exchange resin. The anion-exchangers are generally synthetic resin amine or quaternary ammonium compounds. For example, Dowex 1 is a strongly basic quaternary ammonium resin having the trimethyl benzyl ammonium active group on a cross-linked copolymer of styrene and divinylbenzene. Dowex 2 differs only in that one of the methyl groups is replaced by an ethanol group. These resins have exchangeable anions associated with each quaternary ammonium group. Other known anion-exchangers may be used, such as Dowex 3 which has a polyamine active group on the same nucleus.

These anion-exchangers will be treated with solutions of alkali metal tripolyphosphate or the like so that the resin contains the desired anion. An aqueous solution of a suitable copper salt, such as a soluble inorganic copper salt, as previously described, is then passed through a column of the anion-exchange resin containing the phosphate ion. Examples of suitable copper salts are cupric sulfate, chloride, nitrate, bromide and the like. The resulting effluent contains the desired copper phosphate and it may be treated as previously described.

The following examples are further illustrative of the nature of the present invention and are not intended to limit the scope thereto in any manner. All amounts are by weight unless otherwise specified.

*Example I*

A column of cation-exchange resin known as Dowex 50, 16 cm. x 3.8 cm.$^2$, is converted to the cupric form by means of passage of 400 ml. of 1 M $CuCl_2$ solution. This cation exchanger has nuclear sulfonic groups, about 8% divinylbenzene cross-linkage with a particle size of about 100 mesh. The cupric-containing resin column is then washed with water to remove any excess copper and chloride ions. A solution of 5.0 grams of recrystallized sodium tripolyphosphate hexahydrate (containing about 1.8% orthophosphate and 7.2% pyrophosphate) in 50 ml. water is passed through the resin column. The first 20 ml. of effluent is discarded and the following 300 ml. is collected in a container, representing about a one percent solution of copper tripolyphosphate. The addition of 50 ml. of ethanol to the effluent yields a light blue precipitate which is filtered on a Büchner funnel. The precipitate is transferred to a capsule and is dried overnight under reduced pressure in a desiccator.

The product is insoluble in water, but readily soluble in excess ammonium hydroxide or hydrochloric acid. The product contains 31.4% copper, 17.7% total phosphorus and 20% water. The distribution of the different copper phosphate species which are present is 1.8% copper orthophosphate, 7.2% copper pyrophosphate, and 91.0% copper tripolyphosphate. The product is analyzed for sodium with negative results. From the analysis, the product is essentially the cupric tripolyphosphate decahydrate and dodecahydrate.

*Example II*

The procedure of Example I is repeated using an anion-exchange resin known as Dowex 1 through which is passed a 5% aqueous sodium tripolyphosphate solution. The column of resin particles is then treated with a 5% aqueous solution of cupric sulfate and the resulting effluent is recovered as described.

Although the present invention has been described with reference to particular embodiments and examples, it will be apparent to those skilled in the art that variations and modifications of this invention can be made and that equivalents can be substituted therefor without departing from the principles and true spirit of the invention.

I claim:

1. A process for producing copper phospate solution in high purity which comprises treating an aqueous solution of a water-soluble salt selected from the group consisting of soluble copper salts and soluble phosphate salts with an ion-exchange resin selected from the group consisting of phosphate-containing anion exchange resins and copper-containing cation exchange resins, said copper salt solution being used with said phosphate-containing resin and said phosphate salt solution being used with said copper-containing resin, so as to form an aqueous solution containing dissolved copper cation and phosphate anion, and recovering said copper phosphate solution in high purity from said ion exchange resin.

2. A process which comprises contacting a cation-exchange resin containing copper ions with an aqueous solution of an alkali metal polyphosphate salt, and recovering an effluent containing copper polyphosphate dissolved therein in high purity.

3. A process which comprises treating a sulfonated cation-exchange resin containing cupric ions with an aqueous solution of alkali metal tripolyphosphate, and separating a solution containing cupric tripolyphosphate hydrate dissolved therein in high purity.

References Cited in the file of this patent

UNITED STATES PATENTS

| | | |
|---|---|---|
| 2,259,754 | Layng | Oct. 21, 1941 |
| 2,414,647 | Hoeppel | Jan. 21, 1947 |
| 2,551,355 | Weiss | May 1, 1951 |
| 2,551,356 | Weiss | May 1, 1951 |
| 2,554,819 | Eads | May 29, 1951 |
| 2,648,601 | Byler et al. | Aug. 11, 1953 |
| 2,770,522 | Bailes et al. | Nov. 13, 1956 |
| 2,830,878 | Miller et al. | Apr. 15, 1958 |
| 2,771,418 | Zeegers | Nov. 20, 1958 |

OTHER REFERENCES

Industrial and Engineering Chemistry, Ion Exchange in Waste Treatment, Boehner et al., March 1949, vol. 41, No. 3, pages 447–457.